US012128430B2

(12) United States Patent
Zhmayev et al.

(10) Patent No.: US 12,128,430 B2
(45) Date of Patent: Oct. 29, 2024

(54) METHOD FOR ASSESSING A SHAPE OF A BELL-SHAPED LIQUID SPRAY

(71) Applicant: BASF COATINGS GMBH, Muenster (DE)

(72) Inventors: Yevgen Zhmayev, Muenster (DE); Fatmir Raka, Muenster (DE); Igor Millbaier, Muenster (DE); Georg Wigger, Muenster (DE); Daniel Briesenick, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 415 days.

(21) Appl. No.: 17/756,453

(22) PCT Filed: Nov. 21, 2020

(86) PCT No.: PCT/EP2020/082997
§ 371 (c)(1),
(2) Date: May 25, 2022

(87) PCT Pub. No.: WO2021/105026
PCT Pub. Date: Jun. 3, 2021

(65) Prior Publication Data

US 2023/0001438 A1 Jan. 5, 2023

(30) Foreign Application Priority Data

Nov. 27, 2019 (EP) .................................... 19211889

(51) Int. Cl.

| | |
|---|---|
| ***B05B 12/08*** | (2006.01) |
| ***B05B 3/10*** | (2006.01) |
| ***B05B 5/04*** | (2006.01) |

(52) U.S. Cl.
CPC .......... *B05B 12/082* (2013.01); *B05B 3/1014* (2013.01); *B05B 5/0407* (2013.01)

(58) Field of Classification Search
None
See application file for complete search history.

(56) References Cited

U.S. PATENT DOCUMENTS

| | | | |
|---|---|---|---|
| 9,688,877 | B2 | 6/2017 | Flosbach et al. |
| 2007/0098926 | A1 | 5/2007 | Uhlianuk et al. |
| 2021/0262912 | A1 | 8/2021 | Briesenick et al. |

FOREIGN PATENT DOCUMENTS

| | | | | |
|---|---|---|---|---|
| JP | 03186768 | A | * | 8/1991 |
| JP | H03 186768 | A | | 8/1991 |
| JP | H03 253762 | A | | 11/1991 |
| JP | 2001 050866 | A | | 2/2001 |

OTHER PUBLICATIONS

International Search Report and Written Opinion for corresponding PCT/EP2020/082997 mailed Feb. 22, 2021, 3 pages.

* cited by examiner

*Primary Examiner* — Michael P. Rodriguez
(74) *Attorney, Agent, or Firm* — Armstrong Teasdale LLP

(57) ABSTRACT

Disclosed herein is a method for assessing a shape of a bell-shaped liquid spray, including the steps of operating a spray nozzle for delivering a bell-shaped liquid spray and capturing an image of a plurality of liquid jets forming the delivered bell-shaped liquid spray during operation of the spray nozzle, and a computer program product for assessing a bell-shaped liquid spray.

14 Claims, 3 Drawing Sheets

METHOD FOR ASSESSING A SHAPE OF A BELL-SHAPED LIQUID SPRAY

CROSS-REFERENCE TO RELATED APPLICATIONS

This application is a U.S. National Phase Application of International Patent Application No. PCT/EP2020/082997, filed Nov. 21, 2020, which claims priority to European Patent Application No. 19211889.1, filed Nov. 27, 2019, each of which is hereby incorporated by reference herein.

FIELD OF THE INVENTION

The invention relates to a method for assessing a shape of a bell-shaped liquid spray. The method comprises the steps of operating a spray nozzle for delivering a bell-shaped liquid spray and capturing an image of a plurality of liquid jets forming the delivered bell-shaped liquid spray during operation of the spray nozzle. The invention further relates to a computer program product for assessing a shape of a bell-shaped liquid spray.

BACKGROUND

Bell-shaped liquid sprays are widely used for applying liquid coatings onto surfaces. A bell-shaped liquid spray may be delivered by a disc-shaped or conical spray nozzle rotating about a rotation axis at a high angular speed while the liquid coating is continuously fed to the spray nozzle. The fast rotation of the spray nozzle makes the liquid coating undergo a strong centrifugal force which accelerates the liquid coating in a radial direction with respect to the rotation axis. Apart from the centrifugal force, the liquid coating undergoes a plurality of further forces like a viscoelastic force, a surface tension force, a gravitational force, an aerodynamic drag force and an electrostatic force.

Due to a plurality of radial grooves disposed next to each other along a perimeter of the spray nozzle the accelerated liquid coating forms a plurality of distinct liquid jets when separating from the spray nozzle. The liquid jets are arranged along the perimeter of the spray nozzle at essentially equal distances from one another. The interplay of the above-mentioned forces cooperation leads to a bell-shape of the liquid coating spray.

A bell-shaped liquid coating spray may be used for coating a large variety of different workpieces and is preferably used by car manufacturers for applying coatings onto surfaces of car body parts. Car body parts are coated mainly for an aesthetic appearance of the car and for protecting the materials of the car body parts from deterioration, i.e. from damage, wear and corrosion. For an optimal effect a coating has to be applied onto a surface of a car body part as uniformly as possible.

Accordingly, car manufacturers keep on improving the bell-shaped liquid coating spray by optimizing a shape of the spray nozzle, a viscosity of the liquid coating and a plurality of bell spraying parameters like the angular speed of the spray nozzle and the feeding rate of the liquid coating in order to achieve a higher quality of the applied coating.

SUMMARY OF THE INVENTION

It is therefore an object of the invention to propose a method for assessing a shape of a bell-shaped liquid spray which assessment allows for optimizing the bell-shaped liquid spray. Another object of the invention is to provide a computer program product for assessing a shape of a bell-shaped liquid spray.

One aspect of the invention is a method for assessing a shape of a bell-shaped liquid spray. The method comprises the steps of operating a spray nozzle for delivering a bell-shaped liquid spray and capturing an image of a plurality of liquid jets forming the delivered bell-shaped liquid spray during operation of the spray nozzle. The method is based on a normal operation of the spray nozzle.

During a normal operation, the spray nozzle rotates at an angular speed in a range about from 10.000 rotations per minute (rpm) to 70.000 rpm about a rotation axis. While the spray nozzle is rotating the liquid, preferably a coating, is continuously fed to the spray nozzle at a feeding rate in a range about from 50 ml/min to 400 ml/min. Due to an interplay of a centrifugal force caused by rotation of the spray nozzle and one or more of a viscoelastic force, a surface tension force, a gravitational force, an aerodynamic drag force and an electrostatic force the liquid spray has a shape of a bell while being delivered by the spray nozzle.

The angular speed of the spray nozzle and the feeding rate of the liquid are two important parameters affecting the shape of the bell-shaped liquid spray. A third important parameter affecting the shape of the bell-shaped liquid spray, however, is a viscosity of the liquid and a dependency of the viscosity from an external force applied to the liquid. With respect to the dependency of the viscosity from an external force, Newtonian liquids and non-Newtonian liquids may be distinguished. The former liquids have a viscosity being independent of any external force, i.e. being constant with respect to external forces, while the latter liquids have a viscosity varying dependent on the external force.

During operation of the spray nozzle, a high-speed camera captures one or more subsequent images of the bell-shaped liquid spray being delivered by the spray nozzle. Each captured image represents a frozen state of the bell-shaped liquid spray and comprises a plurality of liquid jets forming the bell-shaped liquid spray which are arranged next to each other along a perimeter of the spray nozzle.

According to the invention, the method comprises the further steps of processing the captured image and deriving at least one shape parameter of the liquid jets from the processed image. Being based on an image captured during a normal operation of the spray nozzle, the inventive method is an empirical method which is directed to obtaining one or more shape parameters associated with the real bell-shaped liquid spray delivered by the real spray nozzle with a real liquid being fed thereto.

The at least one shape parameter is derived by means of image processing. Image processing may comprise one or more steps of pre-processing, segmenting, extracting and post-processing which are described in more detail below.

Advantageously, a lateral view image and/or a partial image of the spray nozzle and the plurality of liquid jets is captured. The lateral view image is captured when the high-speed camera is arranged such that an optical axis of the camera extends transverse or particularly perpendicular to an outer lateral surface of the bell-shaped liquid spray. Capturing a partial image is sufficient and facilitates both arranging the high-speed camera relative to the spray nozzle and processing of the captured image.

In a preferred embodiment, processing the captured image comprises converting the captured image to a binary image, the binary image comprising a plurality of filaments each filament corresponding to a liquid jet and a plurality of arcs each arc connecting two filaments being located next to each other. The binary image may comprise a monochrome, i.e. single-colored, background which, for instance, may be black or white and a foreground which, in turn, may have one or more colors each color of the foreground being different from the single color of the background.

Thus, the binary image facilitates distinguishing the foreground from the background and, particularly, completely ignoring the background of the binary image. The foreground may comprise the filaments and the arcs which alternate along the perimeter of the spray nozzle. A filament shall be understood to be a thin line.

In many embodiments, deriving the at least one shape parameter comprises calculating a distance between a determined first point of a first arc and a determined second point of a second arc, the first arc and the second arc being located on opposite sides of a filament and connected to the filament, and using the calculated distance as the at least one shape parameter, the at least one shape parameter indicating a diameter of the corresponding liquid jet. The distance may be calculated by counting a number of pixels between the first point and the second point and then transforming the counted number of pixels to a distance by using a resolution of the binary image. The distance between the first point and the second point may be interpreted as a diameter or a thickness of the liquid jet corresponding to the filament. The larger the distance between the first and second points is the more liquid has the liquid jet, i.e. the thicker the liquid jet is.

In these embodiments, determining the first point and the second point comprises both minimizing the calculated distance between the first point and the second point and, at the same time, maximizing a distance of the first point and the second point from the filament, respectively. In other words, the first point, the second point and a nearest point of the filament form a triangle. The first and the second point may be easily determined by pattern recognition.

Still in these embodiments, determining the at least one shape parameter may comprise selecting a segment of the binary image, the selected segment essentially comprising the arcs only. Recognizing the arcs in the selected segment automatically, i.e. by pattern recognition, is facilitated.

Additionally or alternatively, deriving the at least one shape parameter comprises isolating a filament, calculating a length of the isolated filament and using the calculated length as the at least one shape parameter, the at least one shape parameter indicating a length of the liquid jet and/or calculating a plurality of widths of the isolated filament along a longitudinal extension of the isolated filament and using the plurality of calculated widths as the at least one shape parameter, the at least one shape parameter indicating a longitudinal evolution of the width of the corresponding liquid jet. The length of the isolated filament may be calculated by counting a number of pixels between a first end point of the filament and a second end point of the filament and then transforming the counted number of pixels to a length by using a resolution of the binary image. The width of the isolated filament at a longitudinal position of the isolated filament may be calculated by counting a number of pixels of the filament crosswise to the longitudinal direction of the isolated filament and then transforming the counted number of pixels to a width by using a resolution of the binary image.

In these embodiments isolating the filament may comprise removing the plurality of arcs from the binary image. Removing the arcs removes connections between the filaments separating the filaments from each other, i.e. rendering the filaments separate objects. With isolated filaments recognizing the filaments automatically, i.e. by pattern recognition, is facilitated.

Additionally or alternatively, processing the captured image may comprise extracting a filament from the binary image and using the shape of the filament as the at least one shape parameter, the at least one shape parameter indicating a trajectory of the corresponding liquid jet. The filament may be extracted by means of pattern recognition. The filament is used as a whole to represent the trajectory of the corresponding liquid jet. The trajectory comprises a length and a possibly varying curvature.

Additionally or alternatively, a sequence of images is captured over a period of time and deriving the at least one shape parameter comprises calculating a whipping frequence of an aligned filament of the corresponding binary images by applying a fast Fourier transformation to the aligned filament and using the calculated whipping frequency as the at least one shape parameter, the at least one shape parameter indicating a whipping frequence of the corresponding liquid jet. The whipping frequence is a dynamic shape parameter as it reflects a whipping movement of the corresponding liquid jet, i.e. a periodic variation of the liquid jet trajectories, during operation of the spray nozzle.

In these embodiments, aligning the filament comprises arranging an extracted filament in a cartesian coordinate system and/or correcting an angle of an extracted filament with respect to a shape of the spray nozzle.

The cartesian coordinate system comprising the extracted filament allows for an advanced calculation of shape parameters. As the filaments are distributed along the perimeter of the spray nozzle, the filaments are rotated relative to each other by a respective associated polar angle with respect to the rotation axis. Correcting the angle of the aligned filament by the associated polar angle pretends the spray nozzle to have a straight perimeter instead of a circular perimeter. Correcting the angle improves an alignment of the filament and increases an accuracy of the shape parameter to be derived.

Preferably, deriving the at least one shape parameter comprises removing an intersecting filament from the binary image. Intersecting filaments join or cross each other. Removing an intersecting filament or preferably every intersecting filament from the binary image may facilitate recognizing a filament automatically, i.e. by pattern recognition, and increases an accuracy of the shape parameter to be derived.

It is noted that any deriving of a shape parameter according to the proposed method may comprise averaging over a large number of liquid jets, i.e. filaments corresponding to liquid jets and connecting arcs, in order to increase an accuracy of the respective derived shape parameter.

The derived at least one shape parameter may be used as an input for numerically simulating a bell-shaped liquid spray and/or as a verification means for a numerically simulated bell-shaped liquid spray. The derived shape parameter may either be used to increase the accuracy of a numerical simulation of the bell-shaped liquid spray or to verify the accuracy of a numeric simulation of the bell-shaped liquid spray. The more accurate the numeric simulation is, i.e. the better the numeric simulation predicts reality including an onset of an instability or an onset of an atomization of the liquid jets, the more efficient the bell-shaped liquid spray configuration may be optimized wherein the bell-shaped liquid spray configuration comprises the spray nozzle, the liquid and parameters affecting the bell-shaped liquid spray.

Additionally or alternatively, the at least one shape parameter may be used for assessing a dependence of the derived at least one shape parameter from a rotational speed of the spray nozzle or from a feeding rate of the liquid or from an airflow. Taking into account any dependency of the shape parameter on parameters of the bell-shaped liquid spray configuration further improves the accuracy of the numeric simulation and the predictive power thereof.

In many embodiments, the method may be carried out by a processor executing a program code implementing the method. In this way assessing the bell-shaped liquid spray may be automated at least partially which increases an efficiency and accuracy of the assessing process.

Another aspect of the invention is a computer program product for assessing a bell-shaped liquid spray. The computer program product comprises a data carrier storing a program code to be executed by a processor. The data carrier may be used for installing the stored program code and/or for upgrading an installed program code with the stored program code.

According to the invention, the program code implements an inventive method. The stored program code enables an existing bell-shaped liquid spray assessment configuration for an increased efficiency and accuracy. The bell-shaped liquid spray assessment configuration comprises a bell-shaped liquid spray configuration, a high-speed camera and a computer being connected to the camera and having a processor and an image processing software to be executed by the processor for processing images captured by the high-speed camera.

It is an essential advantage of the inventive method that shape parameters affecting the bell-shaped liquid spray and dependencies of the shape parameters on parameters of the bell-shaped liquid spray configuration may be empirically derived with both a high efficiency and a high accuracy. The derived empirical shape parameters may be used for improving or verifying a numeric simulation of the bell-shaped liquid spray. The improved numeric simulation exemplarily allows for optimizing the parameters of the bell-shaped liquid spray configuration in order to achieve a higher quality of a coating applied onto a surface by bell-shaped liquid spray. Another advantage of the inventive method is that the inventive method may readily be based on an existing bell-shaped liquid spray assessment configuration.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

BRIEF DESCRIPTION OF THE DRAWINGS

FIG. 3 shows a first binary image the captured image shown in FIG. 2 has been converted to;

FIG. 4 shows a second binary image the captured image shown in FIG. 2 has been converted to;

DETAILED DESCRIPTION OF THE DRAWINGS

Figure 1:
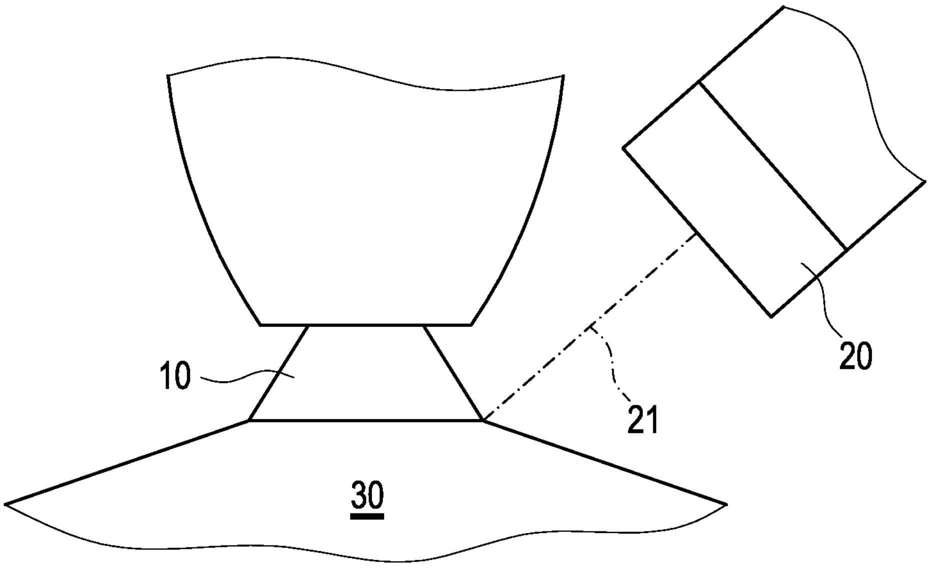
FIG. 1 shows a schematic illustration of a lateral view of a bell-shaped liquid spray assessment configuration according to the invention.

FIG. 1 shows a schematic illustration of a lateral view of a bell-shaped liquid spray assessment configuration according to the invention. The bell-shaped liquid spray assessment configuration comprises a liquid spray configuration with a conical spray nozzle 10 for delivering a bell-shaped liquid spray 30. The bell-shaped liquid spray configuration may be used, for instance, by a car manufacturer for applying a liquid coating onto a surface of a car body part (not shown).

Furthermore, the bell-shaped liquid spray assessment configuration comprises a high-speed camera 20. The high-speed camera 20 is arranged such that an optical axis 21 of the high-speed camera extends transverse to an outer lateral surface of the bell-shaped liquid spray 30. The bell-shaped liquid spray assessment configuration may be used to assess a shape of the bell-shaped liquid spray 30.

The bell-shaped liquid spray assessment configuration further comprises a computer (not shown). The computer has a processor and a memory comprising a program code, the program code implementing a method for assessing a shape of a bell-shaped liquid spray 30 and being executable by the processor. The program code may have been installed in the memory of the computer from a computer program product for assessing a shape of a bell-shaped liquid spray 30 according to the invention, the computer program product comprising a data carrier like a DVD or an USB stick storing the program code. The computer is connected to the high-speed camera 20 for receiving one or more captured images 40 (see FIG. 2) from the high-speed camera 20.

The bell-shaped liquid spray assessment configuration is configured for carrying out a method for assessing a shape of the bell-shaped liquid spray 30 according to the invention. The method comprises the following steps.

The bell-shaped liquid spray 30 is delivered by the spray nozzle 10 during a normal operation of the bell-shaped liquid spray configuration. During the normal operation the spray nozzle 10 rotates at an angular speed in a range about from 10.000 rotations per minute (rpm) to 30.000 rpm about a rotation axis. While the spray nozzle 10 is rotating a liquid, preferably a coating, is continuously fed to the spray nozzle 10 at a feeding rate in a range about from 50 ml/min to 200 ml/min.

During the operation of the spray nozzle 10 the high-speed camera 20 captures an image 40 (see FIG. 2) of the delivered bell-shaped liquid spray 30.

Figure 2:
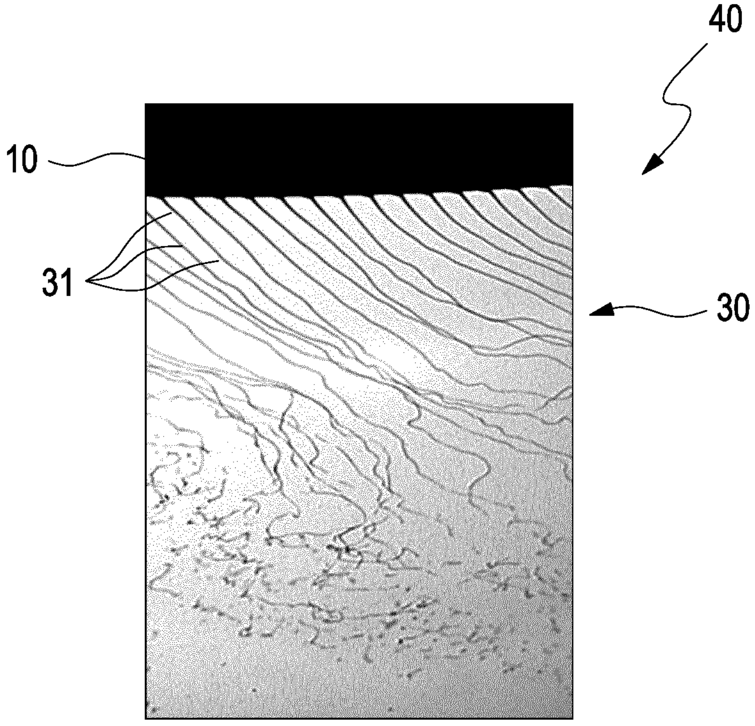
FIG. 2 shows an image captured by the high-speed camera of the bell-shaped liquid spray assessment configuration shown in FIG. 1.

FIG. 2 shows an exemplary image 40 captured by the high-speed camera 20 of the bell-shaped liquid spray assessment configuration shown in FIG. 1. The captured image 40 is a partial lateral view of the spray nozzle 10 and the bell-shaped liquid spray 30. The captured image 40 comprises a plurality of liquid jets 31 forming the delivered bell-shaped liquid spray 30.

In further steps of the method the captured image 40 is processed by the computer and at least one shape parameter of the liquid jets 31 is derived from the processed image.

Figure 3:
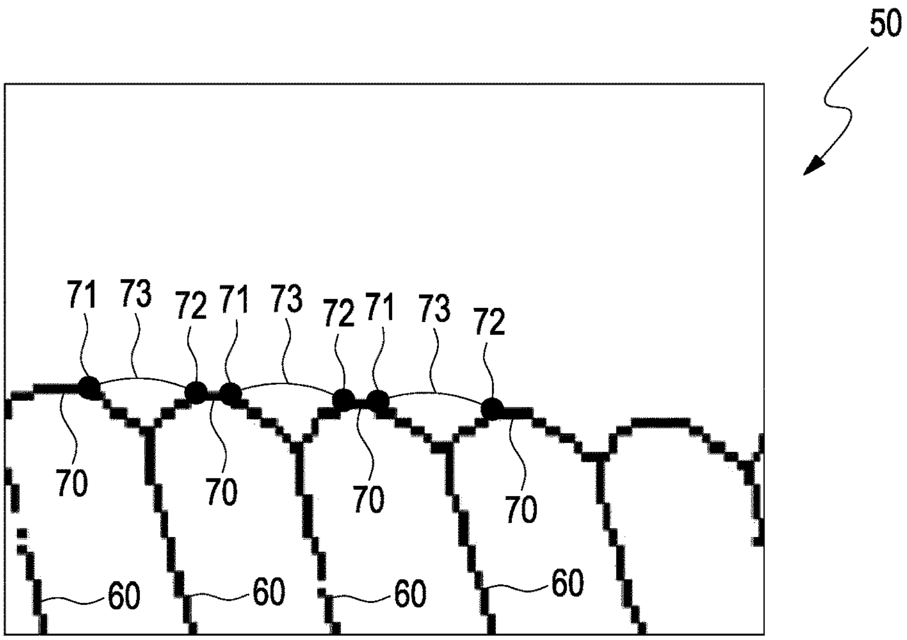
Figure 4:
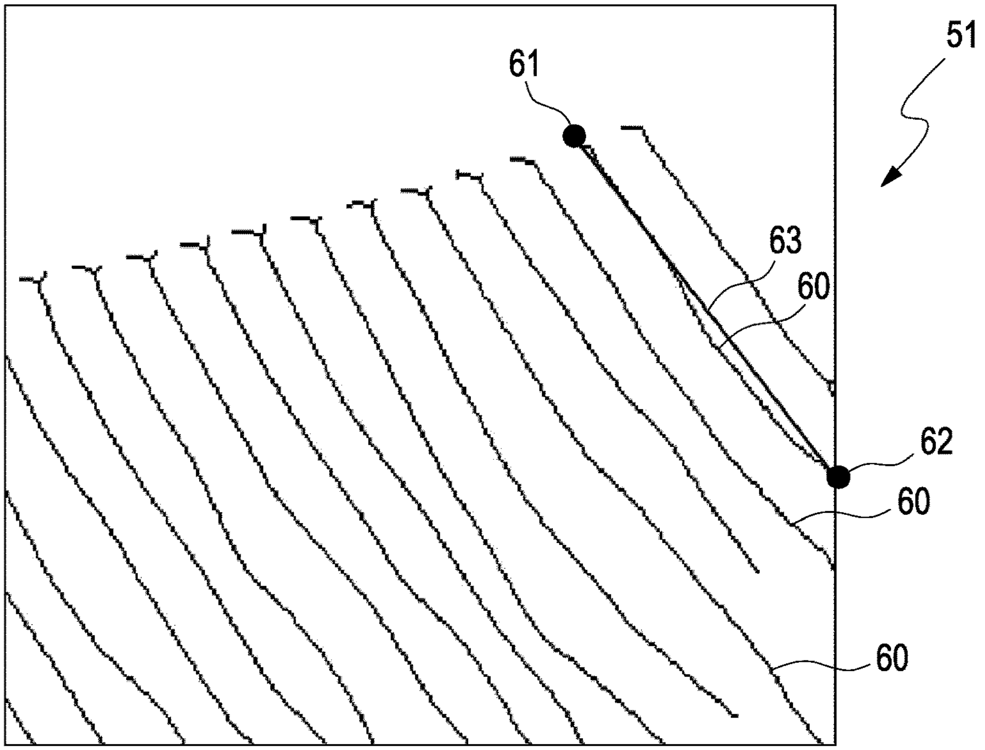

Processing the captured image 40 comprises converting the captured image 40 to a binary image 50 (see FIG. 3), 51 (see FIG. 4). The processing may comprise a pre-processing of the captured image 40 like applying one or more graphic filter algorithms to the captured image 40 in order to increase a contrast of the captured image 40 or to sharpen the captured image 40. The processing may also comprise a post-processing of the binary image 50 like thickening and/or coloring the filaments 60 and/or arcs 70 in order to facilitate an automatic pattern recognition.

FIG. 3 shows a first binary image 50 the captured image 40 shown in FIG. 2 has been converted to. The binary image 50 comprises a plurality of filaments 60. Each filament 60 corresponds to a liquid jet 31. The binary image 50 further comprises a plurality of arcs 70. Each arc 70 connects two filaments 60 being located next to each other. As a first shape parameter a diameter of a liquid jet 31 may be derived from the first binary image 50.

Deriving the first shape parameter comprises calculating a distance 73 between a determined first point 71 of a first arc 70 and a determined second point 72 of a second arc 70, the first arc 70 and the second arc 70 being located on opposite sides of a filament 60 corresponding to the liquid jet 31 connected to the filament 60. Determining the first point 71 and the second point 72 comprises both minimizing the calculated distance 73 between the first point 71 and the second point 72 and, at the same time, maximizing a distance of the first point 71 and the second point 72 from the filament 60, respectively.

The distance 73 may be calculated by counting a number of pixels between the first point 71 and the second point 72 and then transforming the counted number of pixels to a distance 73 by using a resolution of the binary image. The calculated distance 73 is used as the first shape parameter indicating a diameter of the corresponding liquid jet 31.

Deriving the first shape parameter may further comprise averaging the calculated distance 73 over a large number filaments 60 and connecting arcs 70 in order to increase an accuracy of the first shape parameter.

FIG. 4 shows a second binary image 51 the captured image 40 shown in FIG. 2 has been converted to. The second binary image 51 comprises a plurality of filaments 60. Each filament 60 corresponds to a liquid jet 31. As a second parameter a length of a liquid jet 31 may be derived from the second binary image 51.

Deriving the second parameter comprises removing intersecting filaments from the binary image 50 and isolating a filament 60 corresponding to the liquid jet 31, calculating a length 63 of the isolated filament 60. Isolating the filament 60 comprises removing the plurality of arcs 70 from the binary image 51.

The length of the isolated filament 60 may be calculated by counting a number of pixels between a first end point 61 of the filament 60 and a second end point 62 of the filament 60 and then transforming the counted number of pixels to a length by using a resolution of the binary image 51. The calculated length 63 is used as the second shape parameter indicating a length of the corresponding liquid jet 31.

Deriving the second shape parameter may further comprise averaging the calculated length 63 over a large number filaments 60 in order to increase an accuracy of the second shape parameter.

As a third shape parameter a longitudinal evolution of the width of the corresponding liquid jet 31 may be derived from the second binary image 51. Deriving the third shape parameter comprises calculating a plurality of widths of the isolated filament 60 at a plurality of longitudinal positions along a longitudinal extension of the isolated filament 60.

The width of the isolated filament 60 at a longitudinal position of the isolated filament 60 may be calculated by counting a number of pixels of the isolated filament 60 crosswise to a longitudinal direction of the isolated filament 60 and then transforming the counted number of pixels to a width by using a resolution of the second binary image 51. The plurality of widths is used as the third shape parameter.

Deriving the third shape parameter may further comprise averaging the calculated longitudinal evolutions of width over a large number filaments 60 in order to increase an accuracy of the third shape parameter.

As a fourth parameter a trajectory of a liquid jet 31 may be derived from the second binary image 51. Deriving the fourth shape parameter comprises removing intersecting filaments from the binary image 50 and extracting a filament 60 corresponding to the liquid jet 31 from the binary image 50 and may comprise correcting an angle of the extracted filament 60 with respect to a shape of the spray nozzle 10. The shape of the filament 60 is used as the fourth shape parameter indicating a trajectory of the corresponding liquid jet 31.

Deriving the fourth shape parameter may further comprise averaging the shape over a large number filaments 60 in order to increase an accuracy of the fourth shape parameter.

Figure 5:
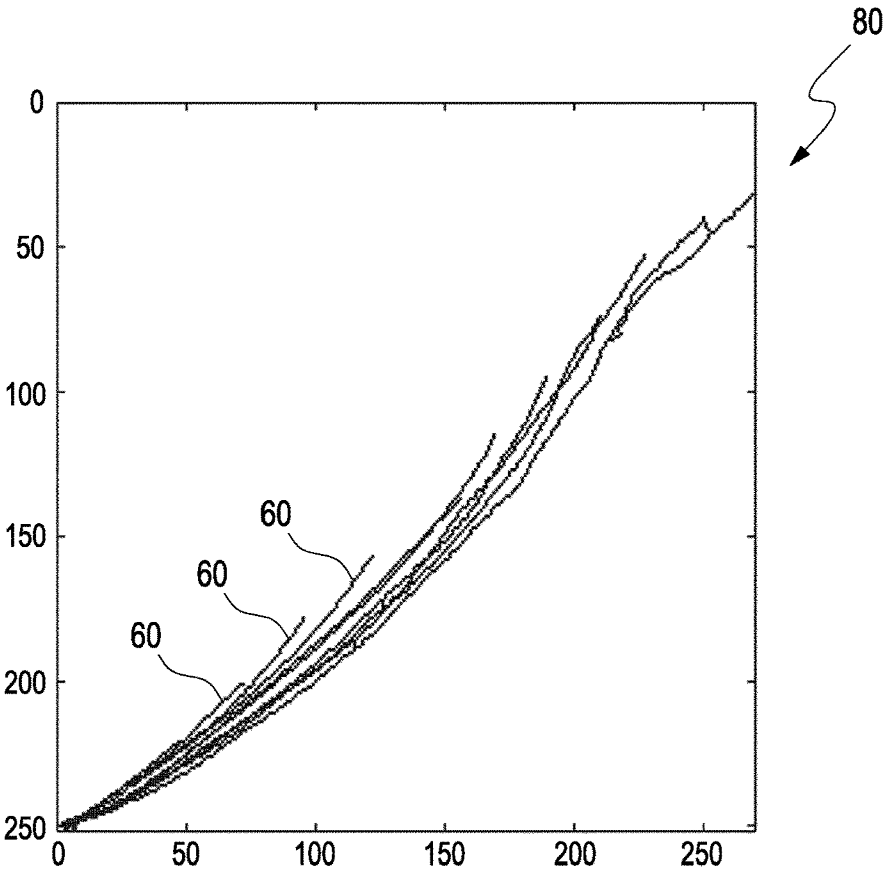
FIG. 5 shows a coordinate system comprising a plurality of aligned filaments.

FIG. 5 shows a coordinate system comprising a plurality of aligned filaments 60. As a fifth parameter whipping frequency of a liquid jet 31 is derived from the cartesion coordinate system 80.

Deriving the fifth parameter is based on a sequence of images 40 being captured over a period of time and comprises calculating a whipping frequency of an aligned filament 60 corresponding to the liquid jet 31 of the corresponding binary images 50 by applying a fast Fourier transformation to the aligned filament 60. Aligning the filament 60 comprises removing intersecting filaments from the binary image 50, extracting a filament 60 corresponding to the liquid jet 31 from the binary image 50 and arranging the extracted filament 60 in the cartesian coordinate system 80 and may comprise correcting an angle of the extracted filament 60 with respect to a shape of the spray nozzle 10. The calculated whipping frequency is used as the fifth shape parameter indicating a whipping frequency of the corresponding liquid jet 31.

Deriving the fifth shape parameter may further comprise averaging the calculated whipping frequency over a large number filaments 60 per image 40 in order to increase an accuracy of the fifth shape parameter.

Figure 6:
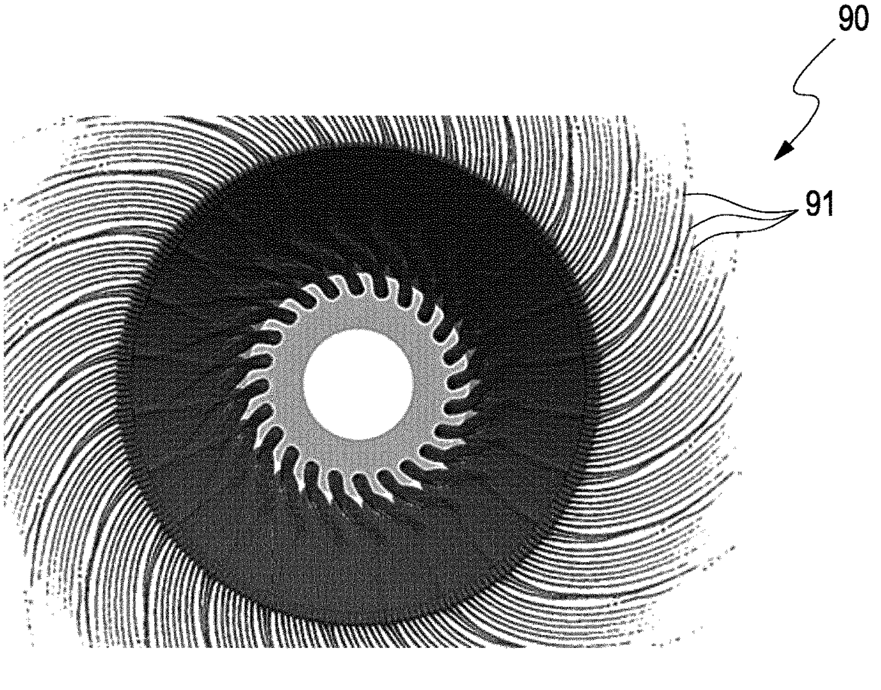
FIG. 6 shows a schematic illustration of a top view of a numerically simulated bell-shaped liquid spray according to the invention.

FIG. 6 shows a schematic illustration of a top view of a numerically simulated bell-shaped liquid spray 90 according to the invention. In still another step the derived shape parameters are used as an input for numerically simulating a bell-shaped liquid spray 90 or as a verification means for a numerically simulated bell-shaped liquid spray 90, the bell-shaped liquid spray 90 having a plurality of numerically simulated liquid jets 91. Additionally, the derived at least one shape parameter may be used for assessing a dependence of the at least one shape parameter on a rotational speed of the spray nozzle 10 or on a feeding rate of the liquid or from an airflow.

REFERENCE NUMERALS

10 spray nozzle
20 high-speed camera
21 optical axis
30 bell-shaped liquid spray
31 liquid jet
40 captured image
50 binary image

51 binary image
60 filament
61 first end point
62 second end point
63 length
70 arc
71 first point
72 second point
73 distance
80 cartesian coordinate system
90 numerically simulated bell-shaped spray
91 numerically simulated liquid jets

The invention claimed is:

1. A method for assessing a shape of a bell-shaped liquid spray, comprising the steps of:

operating a spray nozzle for delivering a bell-shaped liquid spray;

capturing an image of a plurality of liquid jets forming the delivered bell-shaped liquid spray during operation of the spray nozzle;

processing the captured image, wherein processing the captured image comprises converting the captured image to a binary image, the binary image comprising a plurality of filaments, each filament corresponding to a liquid jet and a plurality of arcs, each arc connecting two filaments being located next to each other; and deriving at least one shape parameter of the liquid jets from the processed image.

2. The method according to claim 1, wherein a lateral view image and/or a partial image of the spray nozzle and the plurality of liquid jets is captured.

3. The method according to claim 1, wherein deriving the at least one shape parameter comprises calculating a distance between a determined first point of a first arc and a determined second point of a second arc, the first arc and the second arc being located on opposite sides of a filament and connected to the filament, and using the calculated distance as the at least one shape parameter, the at least one shape parameter indicating a diameter of the corresponding liquid jet.

4. The method according to claim 3, wherein determining the first point and the second point comprises both minimizing the calculated distance between the first point and the second point and, at the same time, maximizing a distance of the first point and the second point from the filament, respectively.

5. The method according to claim 1, wherein deriving the at least one shape parameter comprises isolating a filament, calculating a length of the isolated filament and using the calculated length as the at least one shape parameter, the at least one shape parameter indicating a length of the corresponding liquid jet, and/or calculating a plurality of widths of the isolated filament along a longitudinal extension of the isolated filament and using the plurality of calculated widths as the at least one shape parameter, the at least one shape parameter indicating a longitudinal evolution of the width of the corresponding liquid jet.

6. The method according to claim 5, wherein isolating the filament comprises removing the plurality of arcs from the binary image.

7. The method according to claim 1, wherein deriving the at least one shape parameter comprises extracting a filament from the binary image and using the shape of the filament as the at least one shape parameter, the at least one shape parameter indicating a trajectory of the corresponding liquid jet.

8. The method according to claim 1, wherein a sequence of images is captured over a period of time and deriving the at least one shape parameter comprises calculating a whipping frequency of an aligned filament of the corresponding binary images by applying a fast Fourier transformation to the aligned filament and using the calculated whipping frequency as the at least one shape parameter, the at least one shape parameter indicating a whipping frequency of the corresponding liquid jet.

9. The method according to claim 8, wherein aligning the filament comprises arranging an extracted filament in a cartesian coordinate system and/or correcting an angle of an extracted filament with respect to a shape of the spray nozzle.

10. The method according to claim 1, wherein deriving the at least one shape parameter comprises removing an intersecting filament from the binary image.

11. The method according to claim 1, wherein the at least one shape parameter is used as an input for numerically simulating a bell-shaped liquid spray and/or as a verification means for a numerically simulated bell-shaped liquid spray.

12. The method according to claim 1, wherein the derived at least one shape parameter is used for assessing a dependence of the at least one shape parameter on a rotational speed of the spray nozzle or on a feeding rate of the liquid or from an airflow.

13. The method according to claim 1, wherein the method is carried out by a processor executing a program code implementing the method.

14. A computer program product for assessing a shape of a bell-shaped liquid spray, comprising a data carrier storing a program code to be executed by a processor, the program code implementing a method according to claim 1.

* * * * *